United States Patent [19]

Harwich

[11] Patent Number: 5,377,617
[45] Date of Patent: Jan. 3, 1995

[54] FEEDER WITH FOOD PROTECTION GRID

[76] Inventor: Mary B. Harwich, P.O. Box 533, Glencoe, Ill. 60022

[21] Appl. No.: 19,612

[22] Filed: Feb. 19, 1993

[51] Int. Cl.$^6$ ................. A01K 39/01; A01K 53/00
[52] U.S. Cl. .................... 119/6.5; 119/57.8; 119/58; 449/48
[58] Field of Search ............ 119/6.5, 51.03, 52.2, 119/52.3, 57.8, 57.9, 58, 59, 60, 72, 7; 449/9, 11, 10, 48; 43/107, 113

[56] References Cited

U.S. PATENT DOCUMENTS

| | | |
|---|---|---|
| 865,173 | 9/1907 | Eichberg . |
| 1,092,314 | 4/1914 | White ................. 119/51.03 |
| 1,592,493 | 7/1926 | Kelly . |
| 2,267,883 | 12/1941 | Wood ..................... 119/77 |
| 2,278,281 | 3/1942 | Plante . |
| 2,325,976 | 8/1943 | Phillips . |
| 2,350,461 | 6/1944 | Ivey . |
| 2,591,459 | 4/1952 | Meany ................. 119/52.3 |
| 2,699,752 | 1/1955 | Reyes . |
| 2,799,244 | 7/1957 | Dorsey . |
| 2,845,895 | 8/1958 | Balkauskas . |
| 2,931,336 | 4/1960 | Cather . |
| 2,941,506 | 6/1960 | Fulton . |
| 3,244,150 | 4/1966 | Blair ................. 119/52.2 |
| 3,269,359 | 8/1966 | Kuchenbecker . |
| 3,399,650 | 9/1968 | Goodman .......... 119/51.03 |
| 3,948,220 | 4/1976 | Fiedler ............ 119/51.03 |
| 4,019,459 | 4/1977 | Neff .................. 119/51.04 |
| 4,425,873 | 1/1984 | Rinne, Jr. . |
| 4,434,745 | 3/1984 | Perkins et al. . |
| 4,441,272 | 4/1984 | Bartz . |
| 4,441,458 | 4/1984 | Mereil ................. 119/57.9 |
| 4,821,451 | 4/1989 | Matson . |
| 4,864,770 | 9/1989 | Serio . |
| 4,953,504 | 9/1990 | Taylor . |
| 5,016,573 | 5/1991 | Power . |
| 5,062,390 | 11/1991 | Bescherer et al. ........ 119/77 |
| 5,111,772 | 5/1992 | Lipton . |
| 5,165,365 | 11/1992 | Thompson ............. 119/61 |
| 5,195,463 | 3/1993 | Lorenzana ........... 119/52.2 |

FOREIGN PATENT DOCUMENTS 187952  4/1937  Switzerland ............ 119/51.03

OTHER PUBLICATIONS

Emery, "Hummingbird Cafeteria", *Popular Mechanics*, Dec. 1946 pp. 123-126.

*Primary Examiner*—Todd E. Manahan
*Attorney, Agent, or Firm*—Lockwood, Alex, Fitzgibbon & Cummings

[57] ABSTRACT

A feeder with a food protection grid for butterflies and moths is described. The feeder includes a solid core on which food may be placed. A protective screen or mesh overlays and protects the core and the food secured thereon from consumption by various insects and small animals. The feeding grid has a plurality of openings therethrough which are of an appropriate size to permit a butterfly or moth to reach the food source with its proboscis. The feeder may be hung from an overhead support and a crawling insect guard can be included to prevent small crawling insects such as ants and the like from reaching the protective grid and the food source when the feeder is hung from a tree or the like.

7 Claims, 2 Drawing Sheets

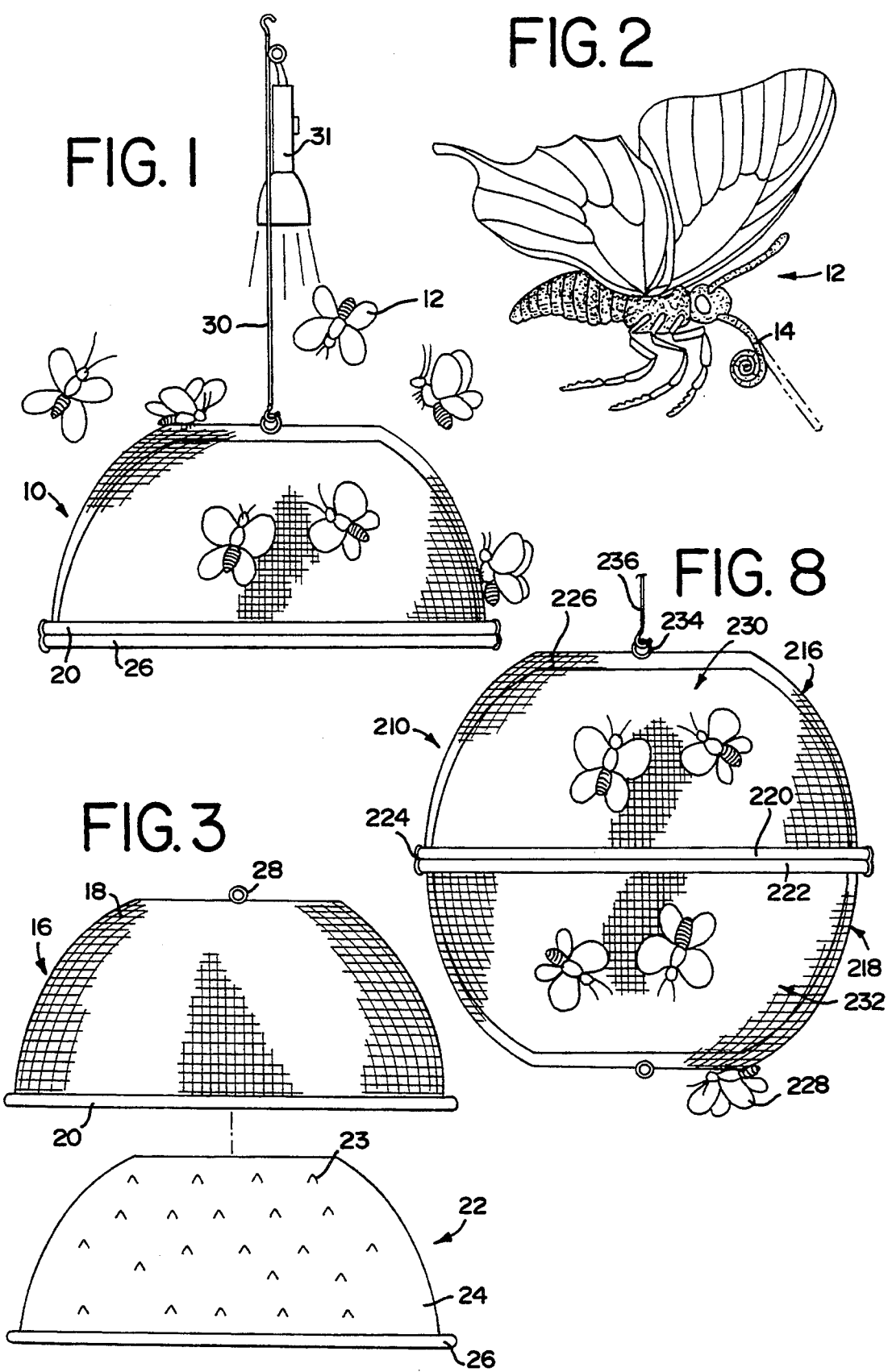

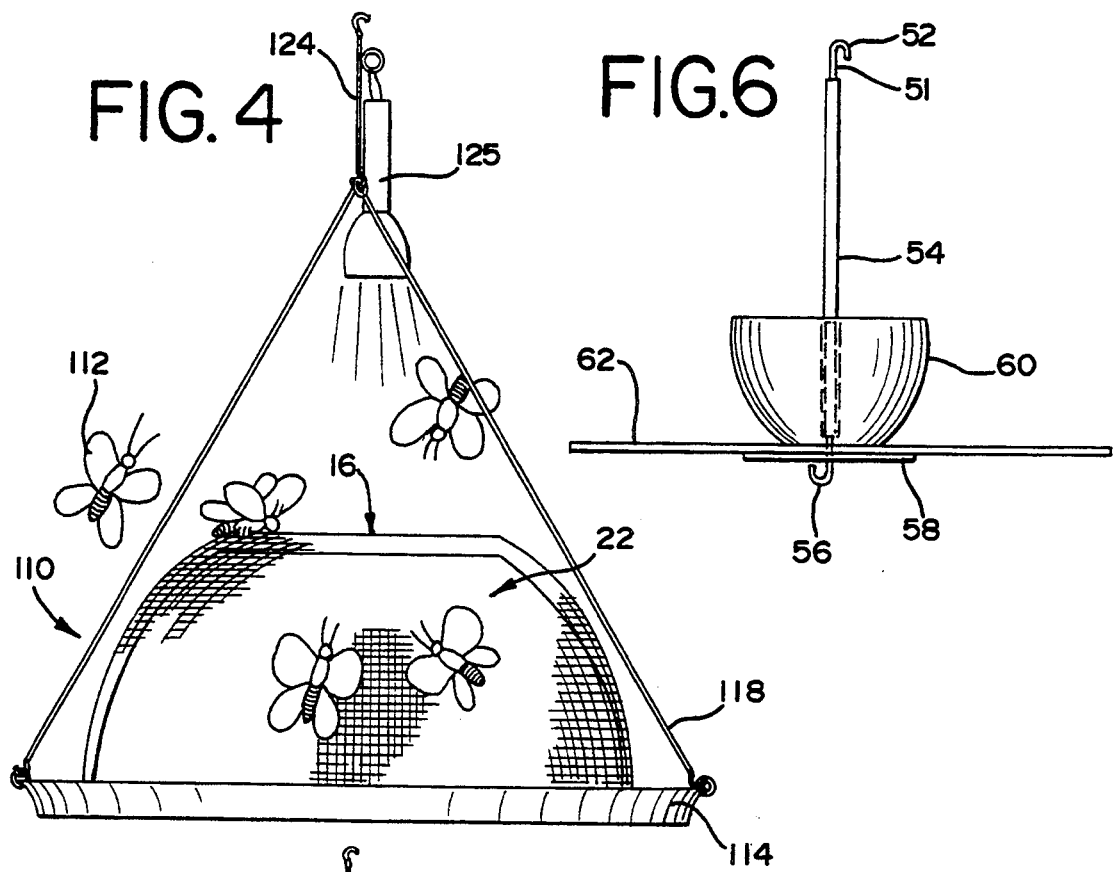
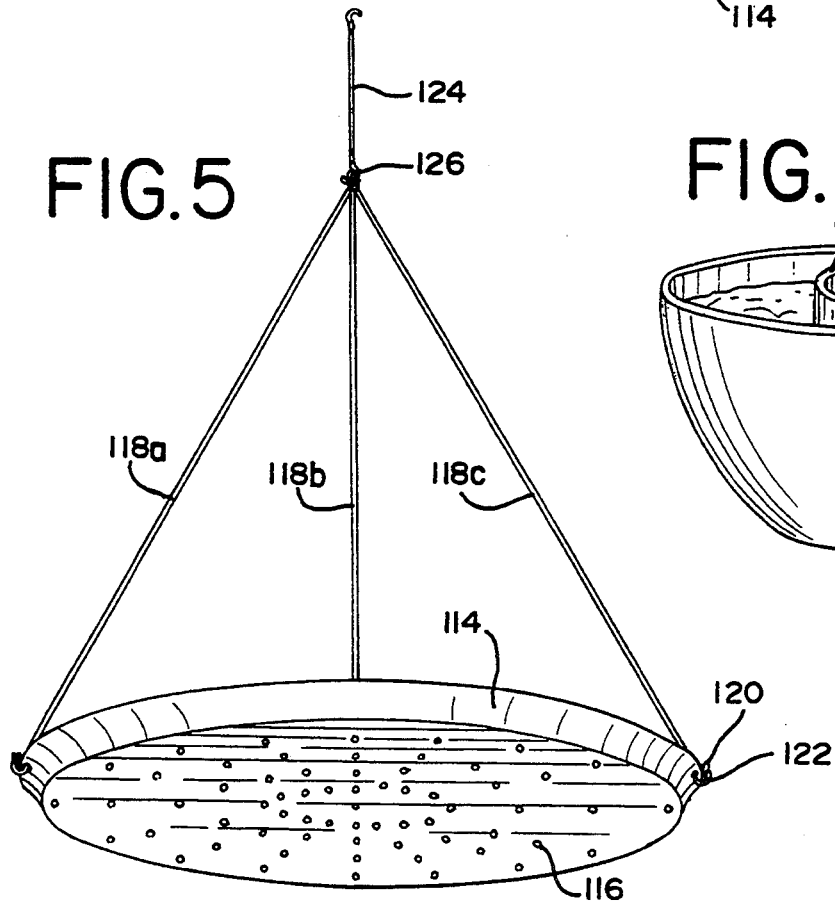

FEEDER WITH FOOD PROTECTION GRID

BACKGROUND OF THE INVENTION

The present invention relates to a feeding apparatus for feeding butterflies, moths and the like. More specifically, the invention relates to a new and improved feeder for butterflies and the like which includes a food protection grid or screen to prevent larger animals as well as many species of insects from reaching the food source in the feeder. The feeder is preferably hung from a tree or the like and can be provided with a crawling insect guard to prevent ants and other crawling insects from reaching the food source within the feeder. A light source may be provided for illumination of the feeder and to attract species of moths which may be more active during the evening hours.

Adult butterflies and moths share common characteristic mouth parts, the chief structure of which is a tubular proboscis or tongue through which liquids can be sucked up into the insect's mouth. When not feeding, the butterfly or moth carries the proboscis in a coiled spiral held beneath the insect's head. When feeding, the proboscis can be extended quickly and thrust deep into a flower or other source of liquid food. These sucking mouth parts are a characteristic of moths and butterflies as a group, allowing these insects to feed on the nectar deep within the individual cups of various flowers.

While it may be desirable to attract butterflies and moths to a feeding device or the like, prior feeders typically have been designed in a manner that allows undesired insects and small animals access to the food source contained within the feeder. While attempts have been made to provide feeders for birds and the like which are intended to prevent other small animals from gaining access into the feeder and consuming the food source, the prior art has generally neglected to provide a feeder for butterflies, moths and the like which capitalizes on their anatomical characteristics and on the manner in which butterflies normally feed in nature and which simultaneously prevents small animals and common pest insects from reaching the food source in the feeder. To overcome the deficiencies of the prior art, it is an object of the present invention to provide a feeder with a food protection grid constructed to allow butterflies, moths and the like access to the food source contained within the feeder while simultaneously preventing larger animals and pest insects from reaching the food source in the feeder.

As another object of the present invention to provide a feeder which may be suspended or hung from a tree, a post or the like.

It is a further object of the invention to provide a feeder which is made from attractive, rugged materials and which may be easily and cost effectively manufactured.

SUMMARY OF THE INVENTION

In accordance with these and other objects, the present invention provides a feeder for butterflies and moths and the like. The feeder includes a solid core on which food may be placed. A protective screen or feeding grid fits over and protects the core and prevents the food secured to the surface of the core from being consumed by various insects and small animals. The feeding grid has a pore or mesh size suitable to permit a butterfly or moth to reach the food source on the core with its proboscis. The spacing between the grid and the core is sufficient to protect the food source on the core from undesired insects and animals while also allowing a butterfly to reach the food by extending its proboscis through the grid.

The core/grid combination of the invention is preferably provided with a hanging ring or similar structure so that it may be hung from a post, a tree or other overhang support. Alternately, the core and grid may be positioned within a tray constructed to be suspended from the overhang support. The hanging tray is provided with drain holes for drainage of rain water and/or other liquids.

An additional crawling insect guard may be provided to prevent small crawling insects such as ants and the like from reaching the protective grid and the food source. In the preferred embodiment, the crawling insect guard is provided as a liquid-filled dish positioned above the feeder and typically associated with a hanger suspending the feeder from the overhang support. The guard is positioned between the feeding grid and the attachment point to the post or tree so that small insects crawling down the hanger attachment rod will encounter the liquid-filled guard before reaching the feeder.

Due to the nature of the feeding grid and, specifically, a fine mesh or pore size, small animals and many species of insects such as flies, bees and the like will be prevented from reaching the food source on the core. The crawling insect guard will also prevent crawling insects such as ants, for example, from crawling down from the tree, post or other support and reaching the feeding grid. Inclusion of the insect guard is advantageous since ants and the like may be small enough to fit through the grid to consume the food within the feeder.

In accordance with the invention, the grid and the core may be provided in various sizes and shapes but each grid/core pair are complementarily shaped to allow sufficient space for food between the feeding grid and the top of the core. A preferred spacing between the grid and the core is between about 0.75 inch (19 mm) and 1.5 inches (38 mm) and most preferably approximately one and one quarter inch (32 mm).

Other objects and advantageous provided by the present invention will become apparent from the following detailed description of the preferred embodiments in conjunction with the drawings.

BRIEF DESCRIPTION OF THE DRAWINGS

FIG. 1 is a side elevational view of a feeder in accordance with a first embodiment of the invention;

FIG. 2 is an enlarged side elevational view of a butterfly;

FIG. 3 is an exploded side elevational view of a portion of a feeder in accordance with a first embodiment of the invention and showing the relationship between the core and feeding grid;

FIG. 4 is a side elevational view of a feeder in accordance with a second embodiment of the invention;

FIG. 5 is a bottom perspective view of a tray, as used in a feeder in accordance with a second embodiment of the invention;

FIG. 6 is a side elevational view of a crawling insect guard for use with the feeder of the invention;

FIG. 7 is a top perspective view of a portion of a the crawling insect guard of FIG. 6; and FIG. 8 is a side elevational view of a feeder in accordance with a third embodiment of the invention.

DETAILED DESCRIPTION OF THE PREFERRED EMBODIMENTS

The feeder of the present invention is designed to accommodate certain flying insects and, more specifically, to accommodate the manner in which butterflies and certain species of moths feed. The feeder of the invention includes a feeding grid which fits over a food-retaining core to maintain predetermined distance between the core and the grid. The grid is provided with a screen or mesh like surface through which a butterfly or moth can feed by insertion of its proboscis therethrough to reach the food source positioned on the inside core. The mesh size of the feeding grid and an optional crawling insect guard prevent undesired insects and small animals from reaching and consuming the food source. The device is preferably hung from a post or tree and, in an alternate embodiment, a hanging tray provides a resting surface for the core and grid combination. In describing the details of the preferred embodiments, reference is made herein to the various figures wherein like reference numerals indicate like elements.

Referring now to the figures, FIG. 1 illustrates a first embodiment of the feeder 10 of the invention. As shown, the feeder 10 is specifically designed to provide a convenient and attractive means for feeding butterflies 12 and like insects such as moths, for example. For the purpose of describing the invention, the terms "butterflies" and "moths" are used interchangeably herein. As shown in FIG. 2, the adult butterfly 12 is equipped with characteristic mouth parts, the chief structure of which being the tubular proboscis 14 through which liquids can be sucked up into the mouth. When not feeding, the butterfly 12 carries the proboscis 14 coiled spirally beneath the head. When feeding, the proboscis 14 can be extended (as shown in phantom) and thrust deeply into a flower or other source of liquid food. As is known, most adult butterflies feed on nectar from flowers, probing the individual cups with the proboscis 14. Certain species also enjoy feeding on over-ripe fruit as well as sweet juices and even aqueous sugar solutions.

Accordingly, the feeder 10 is constructed to take advantage of the characteristic anatomy of the butterfly 12, providing a feeder which is easily accessible to the butterfly while precluding other small insects and animals from consuming the food source. To this end, the feeder 10 is provided with a feeding grid member 16 including a screen or mesh 18 and a grid rim 20 attached to and extending around the lower periphery of the feeding grid 16. The mesh 18 forms the outer surface of the feeder 10 and is a grid or screen having a plurality of small openings therethrough. The openings of the feeding grid 18 are sized to preclude crawling and/or flying insects from passing through the grid 18 but are of a diameter to allow the butterfly 12 to extend its proboscis therethrough for feeding. Preferably, the openings of the grid 18 have a width of less than about 3.0 mm.

The core 22 includes a food bearing surface 24 as well as a core rim 26 attached to and extending around the lower periphery thereof. The food surface 24 is constructed to support a variety of different foods thereon such as overripe fruit, liquid-filled sponges, flowers and the like. As such, the food surface 24 could include means for holding food thereon such as the spikes 23 shown in FIG. 3. Similarly, hooks indentations or other like features could be used to hold and support food on the surface 24. As mentioned the grid 16 and the core 22 are provided with rims 20 and 26, respectively. The rims 20, 26 act as spacers to set the relative positions of the grid 16 and the core 22 in the assembled feeder 10. The grid 16 and the core 22 may be clamped together along their respective rims 20, 26 in the assembled feeder by any suitable means, as known to those skilled in the art.

As shown in FIG. 3, for example, the grid 16 and the core 24 are complimentarily shaped with the core being slightly smaller than the grid. The core 22 is dimensioned to overlay the grid 16 to allow a space between the top of the food surface 24 and the mesh 18 which accommodates the feeding patterns and capabilities of butterflies or moths. A spacing of between approximately 0.75 and 1.5 inches (between about 19 mm and 38 mm) is preferred. It has been found that a spacing of approximately 1.25 inch (32 mm) is especially suitable. While this preferred spacing between the core and the grid should be maintained, the actual sizes of these two components may be varied to provide larger or smaller feeders, according to the needs or desires of the manufacturer.

It will be understood that the grid 16 and the core 22 can be configured in any manner desired. The configuration shown in the drawings, such as in FIG. 3, is not to be construed as limiting in any way. Any desired shape and size are contemplated as within the scope of the invention. It should be noted, however, that when the domed configuration of the various figures is selected, it has been noted that a flat horizontal surface, such as that of the uppermost portion of the mesh 18, provides a preferred feeding area for butterflies and the like. Consequently, a preferred feature to include in building the feeder 10 would be horizontal surfaces like those in the various figures, regardless of the actual configuration chosen for the device.

In the embodiment of FIG. 1, the feeder 10 is provided with a hanging ring 28 affixed to the horizontal surface of the mesh 18. In this manner, a hanger 30 can be attached at one end thereof to the ring 28 and, at the other end thereof, to an appropriate hook or other overhang support to hang the feeder 10 substantially in the orientation shown in FIG. 1, for example. A light source, such as the light 31, may be affixed to the hanger 30 to illuminate the feeder 10 and to attract those species of butterflies or moths which are more active at night.

Referring now to FIGS. 4–5, an alternate embodiment of the invention is shown in the form of the feeder 110, including the above-described grid 16 and core 22 for feeding butterflies 112 in the same manner as described above. The device 110 includes a hanging tray 114 for supporting the core and grid thereon. The tray 114 is preferably provided with a plurality of holes 116 extending through the bottom of the tray to permit drainage of rain water and other liquids. The tray 114 may be hung from a tree or post and is provided with identical support hangers 118a–c. Fastening members such as hanging rings 122 are positioned around the periphery of the tray to receive hook portions 120 or similar attachment components of the identical supports 118. A hanger 124 is provided to hang the feeder 110 from an overhang support or the like and includes a component for attachment to the supports 118, such as a hooked end 126. In this manner, the tray 114 can be suspended from an overhang support and above ground level to protect the feeder 110 from damage by small animals and the like. Light source 125 can be associated with the feeder 110, such as by association with the hanger 124, to illuminate the feeder and attract nocturnal butterflies or moths.

The feeder of the invention may also include two grid/core pairs, suspended separately to provide alternate foods. For example, fresh fruit such as ripe bananas may be used as a food source and placed on a first food core to initially entice the butterflies or moths to the feeder. The second core may include an alternate food source such as an aqueous sugar solution which, while not initially enticing to the insects, is an effective food once the insects have been lured to the device and become accustomed to its location.

Another embodiment of the invention is shown in FIG. 8 wherein a feeder 210 includes upper and lower feeding grid members 216 and 218, respectively. In this embodiment, the grid members 216, 218 are secured to each other at their respective bases and along rims 220, 222. In the depicted embodiment, a set of clips 224 are used to secure rims 220 and 222 to each other, but, other equivalent fastening means are also contemplated as within the scope of the invention. The globe-shaped feeder 210 has a substantial surface area of mesh 226 through which butterflies 228 can feed, as described herein. Upper and lower core members 230, 232 are provided within the feeder 210 to support any of a variety of suitable foods. The feeder may be hung from a tree or other overhead support by providing a hanging ring 234 and hanger 236, as shown.

Optionally, the invention includes a crawling insect guard 50, shown in FIGS. 6–7, to prevent ants and other crawling insects from descending into the feeder 10. The guard 50 includes an elongate sleeve 54 slidably positioned along a hanger 51 which is identical to the hangers 30 and 124 shown in FIGS. 1 and 4, respectively. Hanger 51 includes an upper hook 52 for suspending the insect guard assembly 50 from an overhang support. A lower hook 56 is provided for attachment to the ring 28 or the identical supports 118 of the described embodiments.

The sleeve 54 is preferably between about 4 inches (about 10.2 cm) and about 10 inches (about 25.4 cm) in length. A retaining or supporting member such as the bottom plate 58 is positioned above the lower hook 56 to support a liquid-filled container or bowl 60, providing a liquid barrier which cannot be traversed by crawling insects such as ants or the like. A bowl 60 with a diameter of between about 2 inches (about 5 cm) and about 8 inches (about 20.3 cm) and a wall height of between about 1 inch (2.5 cm) and about 4 inches (10 cm) has been found to be sufficient for inclusion as a component in the guard 50. The bowl 60 includes a center sleeve 64 dimensioned to slidably fit over the elongate sleeve 54.

A rain shield 62 can also be included to provide some protection for the feeder from the weather. The rain shield 62 and the bowl 60 are slidably and non-adhesively positioned along the sleeve 54 for easy addition and removal. A shield 62 with a diameter of between about 10 inches (25 cm) and about 18 inches (46 cm) will provide sufficient protection from the weather.

Regarding materials, the feeder is preferably manufactured with molded plastic parts although metallic parts and other materials are contemplated as within the scope of the invention.

Although preferred embodiments of the present invention have been described and discussed above, it will be understood that certain modifications or changes can be made to those embodiments by those skilled in the art without departing from the true scope and spirit of the invention, as defined in the following claims.

I claim:

1. A feeder for butterflies and moths, comprising:
   a core member for supporting food thereon;
   a protective grid member covering said core member and providing a feeding surface for butterflies and the moths to land thereon;
   said core member and said protective grid member are both of a domed configuration, said core member and said grid member each having at least one horizontal surface thereon and spaced apart at a distance of between about 19 mm and about 38 mm;
   a plurality of openings extending through said grid member, said openings being less than about 3.0 millimeters in width to permit the ingress and egress of the proboscis of a butterfly or moth; and
   hanging means associated with said core member and said protective grid member to vertically hang the feeder from an overhead support, said hanging means including a tray for supporting said core member and said grid member thereon, said tray being adapted for attachment to said overhead support for vertically hanging the feeder therefrom.

2. The feeder of claim 1 wherein said core member includes a food surface forming the uppermost portion of said core member and a core rim associated with the lowermost periphery of said food surface, said protective grid member including a mesh portion forming the uppermost portion of said grid member and a grid rim forming the lowermost portion of said grid member and surrounding the lowermost periphery of said mesh portion, said grid rim resting on said core rim once the protective grid member is covering said core member to thereby provide the space between said core member and said protective grid member.

3. The feeder of claim 1 further comprising a light source to illuminate the feeder and to attract nocturnal species of butterflies or moths thereto.

4. The feeder of claim 1 further comprising a crawling insect guard to prevent ants and other crawling insects from reaching the feeder, said crawling insect guard associated with said hanging means and including a liquid-filled guard component, said guard component providing a liquid barrier to crawling insects attempting to reach the feeder by traversing said hanging means.

5. The feeder of claim 4 wherein said guard component is a liquid filled receptacle having a sleeve extending therethrough to slidably receive said hanging means therein, said insert guard further including a horizontal plate member positioned along said hanging means and supporting said receptacle thereon.

6. The feeder of claim 1 wherein further comprising a rain shield associated with said hanging means, said rain shield horizontally oriented and extending radially from said hanging means to protect the feeder from rain and the like.

7. The feeder of claim 1 wherein said tray includes drainage holes therethrough to allow rain and other liquids to drain from said tray.

* * * * *

UNITED STATES PATENT AND TRADEMARK OFFICE
CERTIFICATE OF CORRECTION

PATENT NO.   : 5,377,617
DATED        : January 3, 1995
INVENTOR(S)  : Mary Belle Harwich It is certified that error appears in the above-indentified patent and that said Letters Patent is hereby corrected as shown below:

```
On the cover page, under "Inventor", line 1, replace "Mary B." with
     --Mary Belle--.
Col. 2, line 43, replace "advantageous" with --advantages--; line 65,
     "portion of a the" should read --portion of the--.
Col. 3, line 9, insert --a-- after "maintain"; line 66, insert a comma
     --,-- after "hooks".
Col. 6, line 12, delete "the".
```

Signed and Sealed this

Twentieth Day of August, 1996

Attest:

BRUCE LEHMAN

*Attesting Officer*         *Commissioner of Patents and Trademarks*